March 16, 1926.  
R. W. HAGEL  
COFFEEPOT  
Filed June 19, 1924

1,577,431

WITNESSES  
Guy M. Spring

Inventor  
ROBERT W. HAGEL

By Richard B. Owen  
Attorney

Patented Mar. 16, 1926.

1,577,431

UNITED STATES PATENT OFFICE.

ROBERT W. HAGEL, OF NEW ORLEANS, LOUISIANA.

COFFEEPOT.

Application filed June 19, 1924. Serial No. 721,086.

*To all whom it may concern:*

Be it known that I, ROBERT W. HAGEL, a citizen of the United States, residing at New Orleans, in the parish of Orleans and State of Louisiana, have invented certain new and useful Improvements in Coffeepots, of which the following is a specification.

This invention appertains to cooking vessels and the primary object of the invention is to provide a novel coffee pot of the percolator type in which the coffee is maintained in an independent compartment or chamber from the boiling water, which is adapted to pass over the grounds of coffee whereby the coffee made is prevented from boiling, thereby insuring the correct flavor thereof.

Another object of the invention is the provision of a novel filter cup for holding the ground coffee and novel means for arranging the filter cup at one side of the pot containing the hot water, whereby the steam rising from the water will maintain the ground coffee in the said cup in a moist and hot condition during the percolating process, thereby insuring the getting of all of the strength from the said ground coffee.

A further object of the invention is to provide a coffee pot of the percolator type in which a relatively small quantity of coffee can be prepared therein, which will have all of the strength and aroma of coffee made in a larger quantity.

A further object of the invention is the provision of a coffee pot embodying a main chamber for receiving the water, a secondary chamber for receiving the made coffee having novel means for supporting the filter cup for receiving the ground coffee, and a percolator tube arranged in the water chamber and provided with a goose neck to permit the hot water to flow into the filter cup.

A still further object of the invention is to provide a coffee pot of the above character, which will be durable and efficient in use, one that will be simple and easy to manufacture, and one which can be placed upon the market at a small cost.

Figure 1:
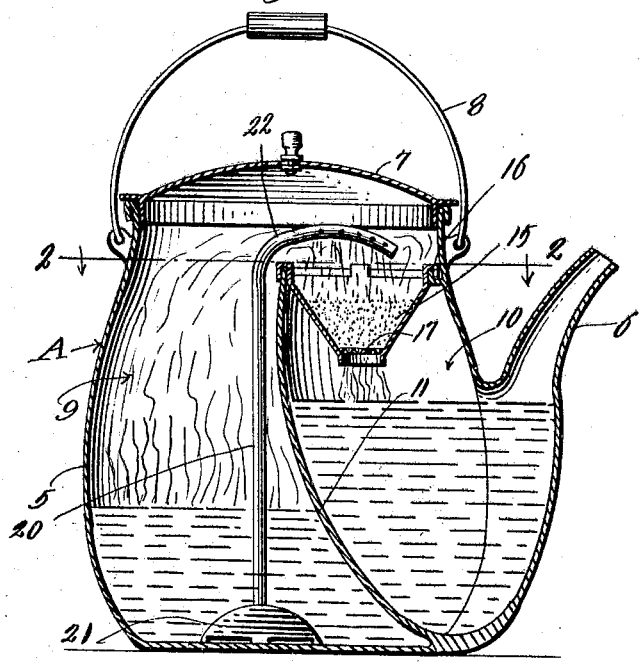
Figure 2:
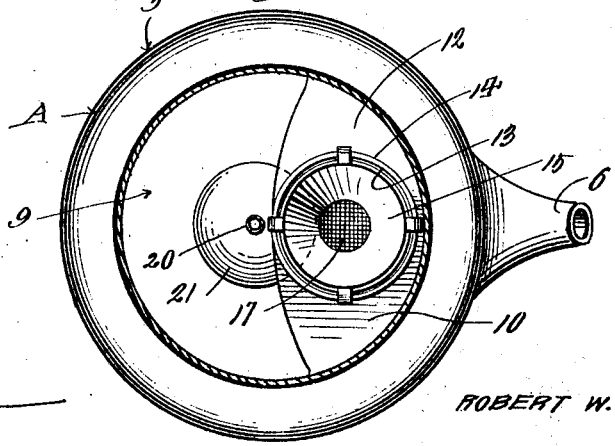

With these and other objects in view, the invention consists in the novel construction, arrangement and formation of parts, as will be hereinafter more specifically described, claimed, and illustrated in the accompanying drawings, in which drawings:

Figure 1 is a vertical longitudinal section through the improved coffee pot, and Figure 2 is a horizontal section through the coffee pot taken on the line 2—2 of Figure 1 looking in the direction of the arrows.

Referring to the drawings in detail, wherein similar reference characters designate corresponding parts throughout the several views, the letter A generally indicates the improved coffee pot which comprises a body 5 which can be shaped in any desired manner. One side of the body 5 is provided with a spout 6 to permit the coffee to be readily poured therefrom. The upper end of the body 5 is left open to permit the easy placing of the hot water and filter cup therein and is closed by a cover 7 of the ordinary or any preferred character. Now the coffee pot can be formed of any desired material such as earthenware, aluminum, or the like, and can be treated in any desired manner to present a neat and attractive appearance. A bail handle 8 is provided for the body to permit the convenient carrying thereof.

In accordance with this invention the body 5 of the pot is divided into a main water receiving compartment 9 and a secondary main coffee receiving compartment 10. These compartments 9 and 10 are formed by an arcuate bridge wall 11 which extends across the pot from one side thereof to the other and the wall 11 is so arranged that the spout 6 will communicate with the compartment or chamber 10. The upper end of the compartment or chamber 10 is closed by a top wall 12 which is provided with a central opening 13 surrounded by a flange 14. This opening 13 is adapted to receive the filter cup 15 for the ground coffee and is of a novel form of construction as can be seen by referring to Figure 1 of the drawings. The filter cup 15 is of a substantially inverted conical shape and the enlarged upper end thereof is provided with hooks 16 which are adapted to engage the flange 14 which holds the filter cup in place. The lower converged end of the filter cup 15 has placed therein suitable filtering material such as fabric or wire screen 17. Owing to the configuration of the filter cup 15 it is obvious that a relatively small quantity of ground coffee can be placed into the cup and all of the strength be derived therefrom when it is desired to make only a small quantity of coffee.

The improved coffee pot A also embodies the percolator tube 20 the lower end of which is provided with a substantially semispherical base 21. The tube 20 and base 21 are of the ordinary type of coffee percolator, but it is to be noted that the upper end of the tube 20 is provided with a goose neck 22 which extends over the filter cup 15 whereby the hot water arising in the tube 20 will fall directly into the cup. When it is desired to make the coffee the desired amount of water is placed into the body 5 that is into the compartment 9 and the filter cup 15 is placed in position with the desired amount of ground coffee therein after which the tube 20 is placed in position as shown in Figure 1 of the drawings. The coffee pot is now ready to be placed upon the stove and it is obvious that when the water begins to boil that the same will rise in the tube 20 and flow into the filter cup 15 where the same will percolate through the ground coffee and flow into the chamber 10. Now by this construction it can be seen that the made coffee is kept separate from the water used to make the coffee and that owing to the position of the chamber 10 the boiling of the coffee therein is eliminated thus insuring the proper flavor thereof.

By the construction of the coffee pot it can be seen that the water and filter cup can be placed in position at practically the same time and that a relatively large area of the coffee in the cup will be subjected to the live steam arising from the water.

Changes in details may be made without departing from the spirit or the scope of this invention, but—

What I claim as new is:

As a new article of manufacture, a coffee percolator comprising a body having an upper open end, a cover detachably connected with the open end of the body, one side of the body being provided with a pointed spout, an arcuate bridge wall extending across the body and connected with the opposite sides thereof and terminating short of the upper edge of the body and extending to the lower wall of the body and enclosing said spout, said bridge wall defining a main water receiving compartment and a made coffee receiving compartment, an inverted substantially frusto-conical shaped ground coffee receiving cup disposed in the upper end of said made coffee compartment, and a percolator tube having an enlarged base detachably fitted within the main water receiving compartment at one side of the bridge wall, the upper end of said tube being provided with a perforated goose neck disposed over said coffee cup.

In testimony whereof I affix my signature.

ROBERT W. HAGEL.